United States Patent
Ducharme

(10) Patent No.: US 8,131,995 B2
(45) Date of Patent: Mar. 6, 2012

(54) PROCESSING FEATURE REVOCATION AND REINVOCATION

(75) Inventor: Paul Ducharme, Scarborough (CA)

(73) Assignee: Vixs Systems, Inc., Toronto, Ontario (CA)

( * ) Notice: Subject to any disclaimer, the term of this patent is extended or adjusted under 35 U.S.C. 154(b) by 1634 days.

(21) Appl. No.: 11/338,218

(22) Filed: Jan. 24, 2006

(65) Prior Publication Data

US 2007/0174621 A1   Jul. 26, 2007

(51) Int. Cl.
*H04L 29/06* (2006.01)
*G06F 21/00* (2006.01)

(52) U.S. Cl. .......................... 713/156; 705/54

(58) Field of Classification Search .................. 713/156, 713/158, 175, 176, 184; 705/52, 54, 56; 726/30, 31, 33, 26, 27, 29
See application file for complete search history.

(56) References Cited

U.S. PATENT DOCUMENTS

| | | |
|---|---|---|
| 4,866,395 A | 9/1989 | Hostetter |
| 5,027,203 A | 6/1991 | Samad et al. |
| 5,093,847 A | 3/1992 | Cheng |
| 5,115,812 A | 5/1992 | Sano et al. |
| 5,253,056 A | 10/1993 | Puri |
| 5,475,434 A | 12/1995 | Kim |
| 5,563,950 A | 10/1996 | Easter et al. |
| 5,602,589 A | 2/1997 | Vishwanath et al. |
| 5,635,985 A | 6/1997 | Boyce et al. |
| 5,644,361 A | 7/1997 | Ran et al. |
| 5,652,749 A | 7/1997 | Davenport et al. |
| 5,732,391 A | 3/1998 | Fiocca |
| 5,737,020 A | 4/1998 | Hall et al. |
| 5,740,028 A | 4/1998 | Sugiyama et al. |
| 5,844,545 A | 12/1998 | Suzuki et al. |
| 5,850,443 A | 12/1998 | Van Oorschot et al. |
| 5,940,130 A | 8/1999 | Nilsson et al. |
| 5,996,029 A | 11/1999 | Sugiyama et al. |
| 6,005,623 A | 12/1999 | Takahashi et al. |
| 6,005,624 A | 12/1999 | Vainsencher |

(Continued)

FOREIGN PATENT DOCUMENTS

EP    0661826 A2    7/1995

(Continued)

OTHER PUBLICATIONS

Notice of Allowance mailed May 14, 2008 for U.S. Appl. No. 10/830,242, 11 pages.

(Continued)

*Primary Examiner* — Nathan Flynn
*Assistant Examiner* — Abdullah Almamun

(57) ABSTRACT

A method includes storing, at a storage location of a system, a first security value and utilizing, at the system, a first security certificate compatible with the first security value and incompatible with at least a second security value, wherein the first security certificate enables one or more processing features of the system in conjunction with the first security value. The method also includes receiving a certificate revocation stimulus and modifying a value at a first bit position of the storage location so as to convert the first security value stored at the storage location to the second security value. Another method includes receiving multimedia data at a system, wherein the multimedia data is representative of multimedia content including a digital watermark representing one or more system identifiers, and disabling at least one processing feature if the system identifiers includes a unique identifier associated with the system.

30 Claims, 4 Drawing Sheets

U.S. PATENT DOCUMENTS

| | | | |
|---|---|---|---|
| 6,014,694 | A | 1/2000 | Aharoni et al. |
| 6,040,863 | A | 3/2000 | Kato |
| 6,081,295 | A | 6/2000 | Adolph et al. |
| 6,141,693 | A | 10/2000 | Perlman et al. |
| 6,144,402 | A | 11/2000 | Norsworthy et al. |
| 6,167,084 | A | 12/2000 | Wang et al. |
| 6,182,203 | B1 | 1/2001 | Simar, Jr. et al. |
| 6,215,821 | B1 | 4/2001 | Chen |
| 6,219,358 | B1 | 4/2001 | Pinder et al. |
| 6,222,886 | B1 | 4/2001 | Yogeshwar |
| 6,236,683 | B1 | 5/2001 | Mougeat et al. |
| 6,259,741 | B1 | 7/2001 | Chen et al. |
| 6,263,022 | B1 | 7/2001 | Chen et al. |
| 6,289,454 | B1 * | 9/2001 | Eslinger et al. ............... 713/189 |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,438,168 | B2 | 8/2002 | Arye |
| 6,480,541 | B1 | 11/2002 | Girod et al. |
| 6,526,099 | B1 | 2/2003 | Christopoulos et al. |
| 6,549,561 | B2 | 4/2003 | Crawford |
| 6,584,509 | B2 | 6/2003 | Putzolu |
| 6,714,202 | B2 | 3/2004 | Dorrell |
| 6,724,726 | B1 | 4/2004 | Coudreuse |
| 6,748,020 | B1 | 6/2004 | Eifrig et al. |
| 6,804,779 | B1 * | 10/2004 | Carroni et al. ................. 713/176 |
| 7,110,985 | B2 * | 9/2006 | Chase et al. .................... 705/59 |
| 7,120,253 | B2 | 10/2006 | Ducharme et al. |
| 7,165,180 | B1 | 1/2007 | Ducharme |
| 7,171,021 | B2 * | 1/2007 | Yoshida et al. ............... 382/100 |
| 7,289,382 | B2 * | 10/2007 | Mozdzen ................... 365/225.7 |
| 7,395,438 | B2 * | 7/2008 | Parks et al. .................... 713/194 |
| 7,406,598 | B2 | 7/2008 | Ducharme |
| 7,421,741 | B2 * | 9/2008 | Phillips et al. .................. 726/30 |
| 7,578,000 | B2 * | 8/2009 | Kambayashi et al. .......... 726/31 |
| 2001/0026591 | A1 | 10/2001 | Keren et al. |
| 2002/0106022 | A1 | 8/2002 | Satoh et al. |
| 2002/0110193 | A1 | 8/2002 | Yoo et al. |
| 2002/0138259 | A1 | 9/2002 | Kawahara |
| 2002/0145931 | A1 | 10/2002 | Pitts |
| 2002/0196851 | A1 | 12/2002 | Lecoutre |
| 2003/0093661 | A1 | 5/2003 | Loh et al. |
| 2003/0152148 | A1 | 8/2003 | Laksono |
| 2004/0187005 | A1 * | 9/2004 | Molaro ......................... 713/176 |
| 2005/0058291 | A1 * | 3/2005 | Candelore ..................... 380/268 |
| 2006/0047885 | A1 * | 3/2006 | Pan et al. .......................... 711/5 |
| 2006/0053494 | A1 * | 3/2006 | Kamperman et al. .......... 726/27 |
| 2007/0033419 | A1 * | 2/2007 | Kocher et al. ................. 713/193 |
| 2007/0094507 | A1 * | 4/2007 | Rush ............................. 713/176 |
| 2007/0157000 | A1 * | 7/2007 | Qawami et al. ............... 711/170 |
| 2008/0028234 | A1 | 1/2008 | Ducharme |
| 2009/0019275 | A1 * | 1/2009 | Park et al. ......................... 713/2 |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 10/1999 |
| EP | 0955607 A2 | 11/1999 |
| EP | 1032214 A2 | 8/2000 |
| EP | 1087625 A | 3/2001 |
| JP | 07210670 A | 8/1995 |
| WO | 0195633 A2 | 12/2001 |
| WO | 02080518 A2 | 10/2002 |

OTHER PUBLICATIONS

Notice of Allowance mailed Aug. 14, 2007 for U.S. Appl. No. 10/830,242, 14 pages.

"Conexant Products & Tech Info: Product Briefs: CX22702," 2000-2002 Conexant Systems, Inc. access on Apr. 20, 2001.

"Conexant Products & Tech Info: Product Briefs: CX24108," 2000-2002 Conexant Systems, Inc. access on Apr. 20, 2001.

"ICEFYRE Semiconductor: IceFyre 5-GHz OFDM Modern Solution," Sep. 2001, pp. 1-6, ICEFYRE: Rethink Wireless, IceFyre Semiconductor, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard for Information Technology, IEEE Std 802.11a-1999, LAN/MAN Standards Committee.

"Sharp Product Information: VTST-Series NTSC/PAL Electronic Television Tuners," RF Components Group, Sharp Microelectronics of the America, 1997.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros. Communications, Inc., pp. 1-20, Document No. 991-00006-001, Sunnyvale, California.

Aggarwal, Manoj et al., "Efficient Huffman Decoding," 2000 IEEE, 0/7803-6297-7, pp. 936-939, University of Illinois at Urbana-Champaign, Urbana, IL.

Assuncao, Pedro et al., "Rate Reduction Techniques for MPEG-2 Video Bit Streams," SPIE, vol. 2952, Apr. 1996, pp. 450-459, University of Essex, Colchester, England.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Brandenburg, Karlheinz, "MP3 and AAC Explained," Proceedings of AES 17th International Conference, XP008004053, pp. 99-110, Erlangen, Germany.

Chalidabhongse, Junavit et al., "Fast Motion Vector Estimation Using Multiresolution-Spatio-Temporal Correlations," IEEE Transactions on Circuits and Systems for Video Technology, vol. 7, No. 3 Jun. 1997, pp. 477-488.

Ciciora, Walter S., "Cable Television in the United States: An Overview," May 25, 1995, pp. 1-90, Cable Television Laboratories, Inc., Louisville, Colorado.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Fan, Zhigang et al. "Maximum Likelihood Estimation of JPEG Quantization Table in the Identification of Bitmap Compression History," Xerox Corporation, Webster, New York, 10 pages.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Hassanzadegan, Hooman et al., "A New Method for Clock Recovery in MPEG Decoders," pp. 1-8, Basamad Negar Company, Tehran, Iran.

Jostschulte, K. et al., "A Subband Based Spatio-Temporal Noise Reduction Technique for Interlaced Video Signals," University Dortmund, Dortmund, Germany, 2 pages.

Kan, Kou-Sou et al., "Low-Complexity and Low-Delay Video Transcoding for Compressed MPEG-2 Bitstream," Natinal Central University, Chung-Li, Taiwan, 4 pages.

Kim, Jaemin et al., "Spatiotemporal Adaptive 3-D Kalman Filter for Video," pp. 1-12. Samsung Semiconductor, Inc. San Jose, California.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Kroner, Sabine et al., "Edge Preserving Noise Smoothing With an Optimized Cubic Filter," DEEI, University of Trieste, Trieste, Italy, 4 pages.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Lee, Liang-Wei et al., "Dynamic Search-Window Adjustment and Interlaced Search for Block-Matching Algorithm," IEEE Transactions on Circuits and Systems for Video Technology, IEEE, vol. 3, No. 1, Feb. 3, 1993, pp. 85-87, XP000334581 ISSN: 1051-8215, New York.

Lengwehasatit, Krisda et al. "Computationally Scalable Partial Distance Based Fast Search Motion Estimation," Packet Video Corp., San Diego, California, 16 pages.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Liu, Julia J., "ECE497KJ Course Project: Applications of Wiener Filtering in Image and Video De-Noising," pp. 1-15, May 21, 1997.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

Mitchell et al., "MPEG Video Compression Standard: 15.2 Encoder and Decorder Buffering," Chapman and Hall Digital Multimedia Standards Series, pp. 340-356, XP002115299, ISBN: 0-412-08771-5, Chapman and Hall, New York.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014 , Taejon, Korea.

Oz, Ran et al., "Unified Headend Technical Management of Digital Services," BigBend Networks, Inc., 9 pages.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Pozar, David M., "Theory and Design of Ferrimagnetic Components," 1990, pp. 529, Microwave Engineering, Addison-Wesley Publishing Company, Inc.

Pyun, Jae-Young, "QoS Provisioning for Video Streaming Over IEEE 802.11 Wireless LAN," 9abridged) IEEE Conferences in Consumer Electronics, Jun. 16, 2003, EE Times, Seoul, Korea, <http://eetimes.com/printableArticle?doc.sub.--id=OEG2003061S0070> retrieved Jul. 8, 2003.

Ramanujan, Ranga S. et al., "Adaptive Streaming of MPEG Video Over IP Networks, " 22nd IEEE Conference on Local Computer Networks (LCN '97), Nov. 2-5, 1997, IEEE, pp. 398-409, Architecture Technology Corporation, Minneapolis, MN.

Razavi, Behzad, "Challenges in Portable RF Transceiver Design," Sep. 1996, IEEE, pp. 12-25, Circuits & Devices.

Rejaie, Reza et al., "Architectural Considerations for Playback of Quality Adaptive Video Over the Internet," XP002177090, 2000 IEEE pp. 204-209, AT&T Labs, Menlo Park, California.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Sherwood, P. Greg et al., "Efficient Image and Channel Coding for Wireless Packet Networks," University of California, La Jolla, California, 4 pages.

Soares, Luis Ducla, et al., "Influence of Encoder Parameters on the Decoded Video Quality for MPEG-4 Over W-CDMA Mobile Networks," NTT DoCoMo, Inc., 4 pages.

Takahashi, Kuniaki, et al., "Motion Vector Synthesis Algorithm for MPEG2-to-MPEG4 Transcoder," Proceedings of the SPIE 2001, Bellingham, VA, vol. 4310, Sony Corporation, XP008000078, pp. 387-882, 2001 SPIE.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Tourapis, Alexis et al. "New Results on Zonal Based Motion Estimation Algorithms—Advanced Predictive Diamond Zonal Search," 2001 IEEE, pp. V 183-V 186, the Hong Kong University of Science and Technology, Clear Water Bay, Kowloon, Hong Kong.

Weigand, Thomas et al., "Long-Term Memory Motion-Compensated Prediction for Rubust Video Transmittion," in Proc. ICIP 2000, University of Erlangen-Buremberg, Erlangen, Germany.

Whybray, M.W. et al., "Video Coding—Techniques, Standards and Applications," BT Technol J. vol. 14, No. 4, Oct. 4, 1997, pp. 86-100, XP000722036.

Yin, Peng et al., "Video Transcoding by Reducing Spatial Resolution," Princeton University, 2000, Princeton, New Jersey.

Youn, Jeongnam et al., "Video Transcoding for Multiple Clients," Proceedings of the SPIE, Bellingham, VA, vol. 4067, XP008012075, pp. 76-85, University of Washington, Sealttle, WA, 10 pages.

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

* cited by examiner

PROCESSING FEATURE REVOCATION AND REINVOCATION

CROSS-REFERENCE TO RELATED APPLICATIONS

The present application is related to U.S. patent application Ser. No. 10/830,242, filed Apr. 22, 2004 and entitled "Method and System for Secure Content Distribution," the entirety of which is incorporated by reference herein.

FIELD OF THE DISCLOSURE

The present disclosure relates generally to data processing and more particularly to revoking processing features in systems.

BACKGROUND

Concerns about content ownership and copyright protection are driving the development of security procedures for preventing unauthorized copying, modification or distribution of multimedia content. One conventional security procedure includes the provision of security privileges to a system that handles multimedia by binding a security certificate to an encryption key or other system code so that the system is required to have access to both the security certificate and its corresponding system code before particular aspects of the system can be enabled. However, this conventional certificate-binding procedure is susceptible to abuse by a hacker or other unauthorized entity, because once provided, a valid certificate-system code can subsequently be used to gain unauthorized access to multimedia content. Accordingly, revocation techniques have been developed to remove the security privileges of a system. However, conventional revocation techniques are limited in that they typically do not provide an effective way to re-invoke the security privileges of a system in the event that the revocation was in error or deemed to be too harsh under the circumstances, or in the event that the system was transferred to an authorized user. Moreover, many of these conventional revocation techniques are easily circumvented by hackers, thereby reducing their effectiveness when revocation of the security privileges of the system is deemed the proper course of action. Accordingly, improved techniques for revoking and/or re-invoking the processing features of a system would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

Figure 1:
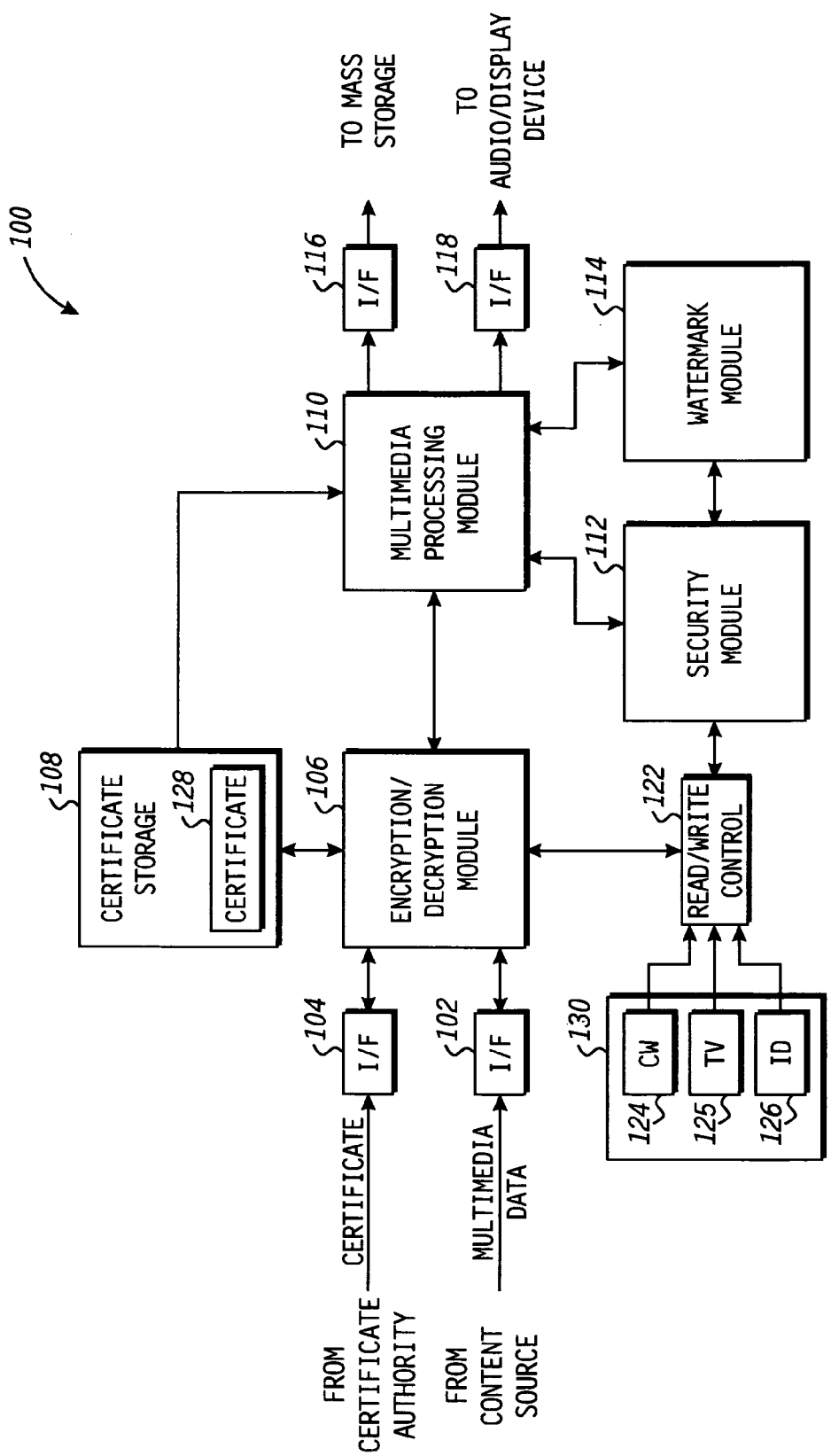
FIG. 1 is a block diagram illustrating an exemplary multimedia system in accordance with at least one embodiment of the present disclosure.

The following description is intended to convey a thorough understanding of the present disclosure by providing a number of specific embodiments and details involving revoking and re-invoking processing features of systems. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with one aspect of the present disclosure, a method includes storing, at a storage location of a system, a first security value. The method further includes utilizing, at the system, a first security certificate compatible with the first security value and incompatible with at least a second security value, wherein the first security certificate enables one or more processing features of the system in conjunction with the first security value. The method additionally includes receiving, at the system, a certificate revocation stimulus, and modifying a value at a first bit position of the storage location so as to convert the first security value stored at the storage location to the second security value.

In accordance with another aspect of the present disclosure, a method includes receiving multimedia data at a system, wherein the multimedia data is representative of multimedia content and wherein the multimedia content includes a digital watermark representing one or more system identifiers. The method further includes disabling at least one processing feature of the system if the one or more system identifiers includes a unique identifier associated with the system.

In accordance with an additional aspect of the present disclosure, a system comprises a storage location to store a security value, a certificate storage component to store one or more security certificates, a multimedia processing module to process multimedia data, and a security module operably coupled to the storage location and the multimedia processing module. The security module is to disable one or more processing features of the multimedia processing module in response to determining an incompatibility between a selected security certificate stored at the certificate storage module and the security value stored at the storage location. The security module further is to modify the security value by modifying a value at an identified bit position in response to a certificate revocation stimulus.

In accordance with yet another aspect of the present disclosure, a system includes an input to receive multimedia data representative of multimedia content, wherein the multimedia content includes digital watermark data representative of one or more system unique identifiers. The system further includes a security module to disable at least one processing feature of the system if the one or more system unique identifiers includes a unique identifier associated with the system.

In accordance with another aspect of the present disclosure, a method includes receiving a request to reinvoke one or more processing features of a system, the request comprising a first security value and generating a first security certificate based on the first security value, wherein the first security certificate enables the one or more processing features of the system in conjunction with the first security value. The method further includes transmitting the first security certificate to the system.

In accordance with another aspect of the present disclosure, a method includes determining that an identified multimedia system has performed an unauthorized action based on a first digital watermark incorporated in data output by the identified multimedia system. The method further includes providing multimedia data for use by a plurality of multimedia systems, wherein the multimedia data represents multimedia content including a digital watermark representative of a multimedia system identifier uniquely associated with the identified multimedia system.

In accordance with another aspect of the present disclosure, a method includes issuing a first security certificate from a certificate authority to a processing device, wherein the first security certificate is compatible with a first security value stored at the processing device and wherein the first security certificate, in conjunction with the first security value, enables one or more processing features of the processing device. The method further includes modifying, at the processing device, the stored first security value to generate a second security value in response to a certificate revocation stimulus, and providing, via a communications link, a reinvocation request from the processing device to the certificate authority in response to modifying the stored first security value. The method additionally includes issuing a second security certificate from the certificate authority to the processing device, wherein the second security certificate is compatible with the second security value stored at the processing device and wherein the second security certificate, in conjunction with the second security value, enables the one or more processing features of the processing device.

In accordance with another aspect of the present disclosure, a system includes a processing device and a certificate authority. The processing device comprises a storage location to store a security value, a certificate storage component to store one or more security certificates and a security module operably coupled to the storage location. The security module is to modify the security value in response to a certificate revocation stimulus to generate a modified security value, disable one or more processing features of the processing device in response to determining an incompatibility between a selected first security certificate stored at the certificate storage module and the security value stored at the storage location, and transmit, via a communications link, a reinvocation request in response to disabling the one or more processing features. The certificate authority is coupled to the processing device via the communications link. The certificate authority is to generate a second security certificate in response to the reinvocation request, wherein the second security certificate is compatible with the modified security value, and issue the second security certificate to the processing device for implementation at the processing device.

FIGS. 1-5 illustrate exemplary techniques for the revocation and/or re-invocation of one or more processing features (e.g., security features) of a system based on the modification of a security value to which a security certificate that enables certain processing features is bound. In at least one embodiment, the security value is stored in a storage location, such as a one-time-programmable storage location, of the system. When a certificate revocation stimulus is received at the system, the security value is modified by changing the value at a bit position of the storage location so as to disable the processing features of the system enabled by the security certificate due to the incompatibility between the modified security value and the security certificate. In response to this incompatibility, the system, or alternately a user of the system, can request a new security certificate compatible with the modified security value from a certificate authority or other entity. Once received, the new security certificate can be installed at the system in place of the invalidated security certificate so as to re-enable the processing features of the multimedia system in combination with the modified security value. This revocation/re-invocation process can be repeated one or more times until a maximum number of re-invocations have occurred, at which time the system can be permanently disabled.

The term "one time programmable storage location" (and its variants), as used herein, is defined as a storage component (e.g., a register, memory, cache, buffer, etc.), or portion thereof, whereby a value at each bit location can transition only once while the storage component is implemented in a system. To illustrate, one-time-programmable (OTP) read-only memories often are manufactured so as to originally store a value of '0' at each bit location. These OTP read-only memories then can be programmed to store data by transitioning the appropriate bit locations to a value of '1' to that the resulting binary sequence represents the stored data. However, once a bit location is transitioned to a value of '1', they cannot be transitioned back to a value of '0' by the systems in which they are implemented. Often, they can't be reprogrammed back to the original bit values in any circumstance. Other examples of OTP storage locations include non-volatile memories and programmable read-only memories, that although reprogrammable, require that they be removed from the system and returned to a manufacturer or third-party for reprogramming.

Due to their particular utility for digital multimedia content protection, the exemplary revocation/re-invocation techniques disclosed herein are described in the context of the revocation of security privileges (one embodiment of revocable processing features) in multimedia systems. Examples of multimedia systems can include complete multimedia systems, such as digital video disc (DVD) players, cable set top boxes (STB), portable video systems, televisions, desktop computers, laptop computers, video-enabled personal digital assistants (PDAs), video-enabled phones, etc., or processing sub-components, such as video processors, video or audio decoders/encoders/transcoders, display controllers, and the like implemented as, for example, a system on a chip (SOC). Those of ordinary skill in the art may implement these techniques in other contexts using the guidelines provided herein without departing from the scope of the present disclosure.

Referring to FIG. 1, an exemplary multimedia system 100 is illustrated in accordance with at least one embodiment of the present disclosure. As depicted, the multimedia system 100 includes a multimedia data interface 102, a security certificate interface 104, an encryption/decryption module 106, a certificate storage component 108, a multimedia processing module 110, a security module 112, a watermark module 114, a mass storage interface 116, a display interface 118, a read/write control module 122, and a plurality of OTP storage locations, such as OTP storage locations 124-126. The various components of the system 100 may be implemented as hardware, software, firmware, or combinations thereof. For example, in one implementation the system 100 may include a multimedia processor implemented as a single integrated circuit, such as a system-on-a-chip (SOC), where certain functionalities may be implemented as circuitry, or alternately, as microcode or other executable instructions executed by a central processing unit of the multimedia processor. In another exemplary implementation, some or all of the functionality of the system 100 may be implemented as software instructions executed by a general processor.

The multimedia data interface 102 received multimedia data representative of multimedia content from a content source. In one embodiment, the multimedia data is data encoded in accordance with a multimedia encoding scheme, such as the motion pictures experts group (MPEG) standard, the MPEG-2 standard, the MPEG-4 standard, the advanced audio encoding (AAC) standard, the Apple QuickTime standard, and the like. In instances where the system 100 includes a sub-component of a multimedia system (e.g., the multimedia processor of a DVD player), the multimedia data interface 102 can include, for example, a memory controller or mass storage controller to receive previously stored or buffered multimedia data from memory or a mass storage system (the content source in this instance). In instances where the system 100 is a multimedia system, the multimedia data interface can include, or example, a cable television interface (e.g., a coaxial cable interface), a data packet network interface (e.g., an Ethernet interface), a wireless interface, and the like.

The certificate interface 104 receives certificate data representative of one or more security certificates from a certificate authority. As described in detail below, the security certificate may be provided to a user via an email, a file-transfer-protocol (FTP) action, and the like. Accordingly, in such instances, the certificate interface 104 and the multimedia data interface may be implemented the same interface.

The certificate storage module 108 stores one or more security certificates 128 for use by the system 100 in enabling various processing features, such as encryption, decryption, multimedia encoding/decoding/transcoding, multiple stream processing, display control functions, and the like. In at least one embodiment, the certificate storage module 108 is accessible only internally to the system 100 so that external access to its contents is prevented. The certificate storage module 108 can include random access memory (RAM), cache, registers, a programmable read-only memory (PROM), and the like. Techniques for isolating the certificate storage component 108 from external access can include, for example, implementing all of the components that need access to the certificate storage component 108 in the same integrated circuit package. In such instances, blowable fuses can be used to link the certificate storage component 108 to the pins of the integrated circuit package in the event that system testing is desirable by a manufacturer.

The encryption/decryption module 106 implements one or more cryptographic techniques to encrypt and/or decrypt data handled by the system 100. For example, security certificates may be received at the system 100 in the form of encrypted data, which may be decrypted by the encryption/decryption module 106 for storage in the certificate storage component 108. Likewise, the encryption/decryption module 106 can be used to encrypt a security certificate before it is stored at an external component, such as a mass storage system via the mass storage system interface 116, so as to prevent unauthorized access to the security certificate while stored externally. Similarly, the encryption/decryption module 106 can decrypt encrypted multimedia data received at the system 100 and encrypt multimedia data before it is output for storage by the system 100.

Exemplary cryptographic techniques implemented by the encryption/decryption module 106 can include Rivest-Shamir-Adleman (RSA)-based encryption, data encryption standard (DES)-based or triple DES (3DES)-based encryption, advanced encryption standard (AES)-based encryption, digital video broadcasting (DVB)-based encryption, Cryptomeria Cipher (C2)-based encryption, and the like. It will be appreciated that many of the cryptographic techniques implementable by the encryption/decryption module 106 make use of various security codes or values, such as a public key, a private key, a code word (CW), an initial value (IV), a unique system identifier (ID), a primary number exponent, and the like. Accordingly, one or more security values are stored at the system 100 for access by the encryption/decryption module 106. In the illustrated embodiment, a CW, an IV, and a system ID are stored at OTP storage locations 124, 125 and 126, respectively, of a storage component 130. The storage component 130 can include, for example, an OTPROM and each of the OTP storage locations 124, 125 and 126 is a corresponding memory location of the OTPROM, or the storage component 130 can include an OTP register file and each of the OTP storage locations 124, 125 and 126 is a corresponding OTP register of the register file. Although the security values are illustrated as stored in OTP storage locations for ease of discussion, some or all of the security values can be stored in non-OTP memory locations, such as general registers, ROM, RAM, caches, and the like. In one embodiment, read and write access to the storage component 130 is provided by read/write control module 122.

The multimedia processing module 110, in one embodiment, processes multimedia data and provides the processed multimedia data for storage in one or more mass storage systems (e.g., hard drives, optical disk drives, etc.) via the mass storage interface 116 or for display or output at a display system or an audio system via the audio/video system interface 118. The multimedia processing module 110 may implement a variety of processing features related to multimedia content, such as audio and/or video encoding, decoding, transcoding, scaling, filtering and the like. In at least one embodiment, the multimedia processing module 110 can operate in both a single stream processing mode, whereby only a single data stream can be processed at any given time, or a dual stream processing mode whereby two (or more) display streams can be processed concurrently.

For received multimedia data, the watermark module 114 can extract digital watermark data embedded in the multimedia data (e.g., embedded in video data, audio data, header data, etc.) using any of a variety of watermarking techniques. In one embodiment, the digital watermark data can include data representative of a list of one or more unique identifiers for the purposes of directing those systems identified by the unique identifiers to initiate a security certificate revocation process as described herein. Additionally, the watermark module 114 can add a digital watermark to processed multimedia data before it is output for storage or display. In at least one embodiment, the digital watermark added by the watermark module 114 includes a representation of a unique identifier associated with the system 100, such as the system ID stored in the OTP storage location 126, thereby allowing a third-party to identify the system as the source of the processed multimedia data for the purposes of identifying systems that are used in an unauthorized manner so that they subsequently can be disabled via security certificate revocation as described herein.

In one embodiment, the security module 112 enables or disables certain processing features of the encryption/decryption module 106, the multimedia processing module 110, the watermark module 114, as well as other components of the system 100 based on the compatibility between the one or more security certificates 128 and the accessibility of their binding security values. In the event that the security module 112 is unable to authenticate a particular security certificate using an available corresponding security value, the security module 112 revokes the security privileges associated with the particular security certificate by directing the components of the system 100 to disable the processing features enabling the security privileges. To illustrate, assume that a particular security certificate 128 is used to enable RSA encryption/decryption by the encryption/decryption module 106 and the security module 112 is unable to authenticate the security certificate 128 with its corresponding security value because the -security value was purposely modified or overwritten so as to revoke the certificate. In this instance, the security module 112 can prevent the encryption/decryption module 106 from implementing RSA encryption by removing the security certificate from the certificate storage component 108 or otherwise preventing the encryption/decryption module 106 from accessing the security certificate 128. Alternately, the security module 112 can provide a signal to the encryption/decryption module 106 or set one or more bits in a control register of the encryption/decryption module 106 so as to disable its RSA encryption/decryption features. In a similar manner, the security module 112 can direct the multimedia processing module 110 to disable one or more of its processing features, which can include, for example, dual stream processing, encoding, decoding or transcoding, by sending a signal, modifying a control register, or preventing access to the corresponding security certificate 128. Moreover, it will be appreciated that in some instances, the incompatibility between the modified security value and the corresponding security certificate may itself prevent a component from effectively implementing one or more processing features.

Further, in at least one embodiment, the security module 112 is responsive to certificate revocation stimuli so as to revoke security privileges by creating incompatibilities between identified security certificates and their security values so as to disable one or more processing features of the system 100. In at least one embodiment, the security module 112 creates an incompatibility between a security certificate 128 the stored security value to which it is bound by modifying the stored security value so that it is no longer compatible with the security certificate. The stored security value can be modified by entirely overwriting one or more bit positions the storage location where the security value is stored, thereby generating in a different resulting security value that is incompatible with the security certificate 128 associated with the previous security value stored in the same storage location.

In one embodiment, a certificate revocation stimulus includes a lapse of a predetermined time or the occurrence of a predetermined event. To illustrate, a security certificate may be valid only for a certain time period, e.g., three months, at which time the security certificate is to be revoked. The passing of this time period, in this instance, may serve as the certificate revocation stimulus. A certificate revocation stimulus, in another embodiment, includes a determination at the system 100 that it is being used in an unauthorized manner. To illustrate, a user may direct the system 100 to encode copyrighted content for storage on a DVD without having the proper permissions. Upon detecting this unauthorized use (via, e.g., the detection of a copyright watermark extracted by the watermark module 114), the system 100 may initiate the revocation process so as to prevent subsequent unauthorized content copying. In another embodiment, a certificate revocation stimulus includes a revocation command received at the system from another source. To illustrate, the revocation command may come from a content provider (such as a television broadcaster, a multimedia distributor or producer), from a governmental or quasi-governmental agency, from a manufacturer of the system, and the like.

Alternately, the certificate revocation stimulus may take the form of the transmission of a list of one or more unique system IDs that are to have security privileges revoked. As described above, the watermark module 114 may be used to insert a digital watermark into data output by the system 100 that identifies the system 100 (using, e.g., its system ID) as the source of the data. Accordingly, content owners and their associates may extract these digital watermarks to identify those systems being used for unauthorized activities and generate lists of IDs to be revoked accordingly. This list, in one embodiment, may be provided as data embedded in the multimedia data received at the system 100 for processing. For example, the list of unique IDs to be revoked may be included in a received multimedia file as a digital watermark that is extracted by the watermark module 114 and provided to the security module 112. The security module 112, in turn, compares the system ID of the system 100 with the list of system IDs. If the ID of the system 100 is present in the list, the security module 112 initiates the revocation process described herein. In another embodiment, the list of IDs to be revoked may be transmitted separately, e.g., as a RF transmission or via a separate transmission channel.

Additionally, in the event that a user would like to re-invoke the security privileges, the security module 112 or, alternately, a user of the system can transmit a request for a new security certificate that is compatible with the modified security value to a certificate authority or other entity via, e.g., an email, a short messaging service (SMS) message, an FTP transfer, etc. As discussed in detail herein, security privileges may be re-invoked up to a maximum number of re-invocations, at which time the security module 112 can permanently disable some or all of the processing features by, for example, blowing fuses associated with the processing features, by permanently overwriting some or all of the security values, or by permanently setting one or more control bits that are used to control access to the processing features.

It will be appreciated that hackers and other unauthorized users may attempt to circumvent the revocation process by attempting to restore the security value stored a particular storage location back to its original value that was compatible with a revoked security certificate. To prevent such circumventions, in at least one embodiment, the security values used for authentication of security certificates are stored at the OTP memory 130 (e.g., in the OTP storage locations 124-126) so that a stored value cannot be reverted back to the original, authenticated value after the security module 112 has modified it by modifying at least one bit value at one or more bit locations of the OTP storage location used to store the value. As discussed above, OTP storage locations have the characteristic of allowing only one transition at each bit location so that once modified, the OTP storage location cannot be reprogrammed to store the original value. Accordingly, in at least one embodiment, one or more bit positions are kept at their initial value during the programming of the OTP storage location so that they can be altered to change the stored value during a revocation process. Further, in one embodiment, one or more other bit positions of a OTP storage location are used to as control bits for disabling corresponding processing features. For example, assuming a thirty-two bit OTP storage location, bits [31:30] can be used as control bits to disable an encryption feature of the encryption module 106 and a dual stream mode of the multimedia processing module 110, respectively. Bits [29:28] can be used as revocation bits whereby bit 28 is transitioned to a value of '1' in response to a first revocation command and bit 29 is transitioned to a value of '1' in response to a second revocation command. The remaining bits [27:0] can be used to store the original security value, such as a unique system ID or encryption key. A security certificate initially may be authenticated based on the entire value of all thirty-two bits then stored at the certificate storage component 108 for use by the system 100 in enabling various processing features.

Figure 2:
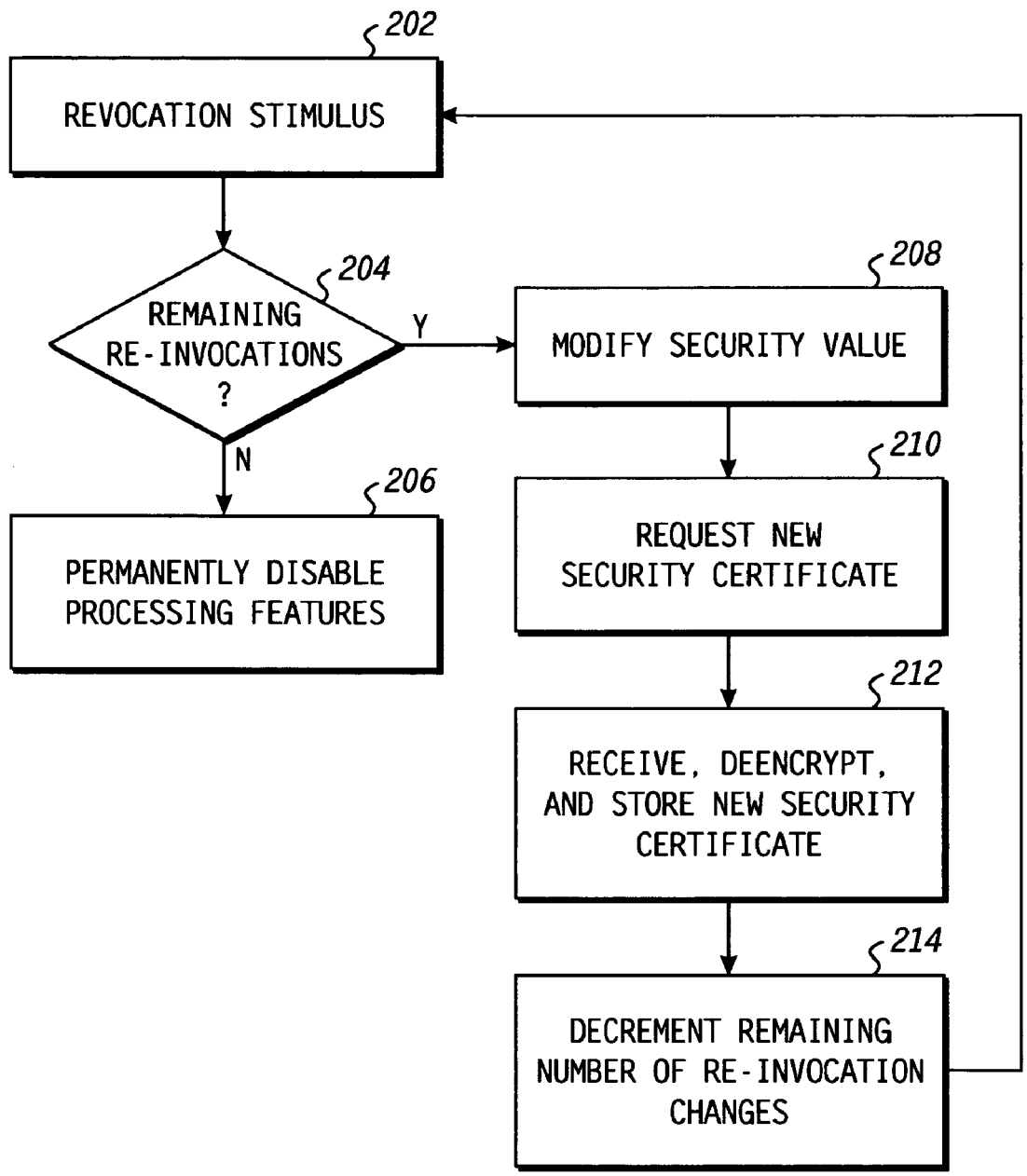
FIG. 2 is a flow diagram illustrating an exemplary method for re-invoking the security privileges of a multimedia system in accordance with at least one embodiment of the present disclosure.

Referring to FIG. 2, an exemplary revocation/re-invocation method 200 is illustrated in accordance with at least one embodiment of the present disclosure. For ease of discussion, the method 200 is described in the context of the exemplary system 100 of FIG. 1. The method 200 includes receiving a certificate revocation stimulus at a multimedia system at block 202. As described above, the certificate revocation stimulus can include, for example, a determination at the multimedia system that an unauthorized activity has occurred or it can include the receipt of a list of system IDs to be revoked, where the system's ID matches one of the listed IDs.

In at least one embodiment, the multimedia system is enabled to re-invoke security privileges up to a maximum number of re-invocations. Accordingly, at block 204 the system determines whether any re-invocation chances remain. As noted above, in one embodiment, each time a revocation stimulus is received, the multimedia system changes a revocation bit location of OTP storage location from its default value (e.g., from a value of '0' to '1') so as to modify the stored security value. Thus, in one embodiment, the maximum number of re-invocations is based on the number of re-invocation bits allocated from the storage location used to store the security value corresponding to the security privileges. Alternately, the number of permitted re-invocations can be represented by a value stored in a decremented counter.

In the event that the maximum number of re-invocations already have been performed, the system permanently disables the corresponding processing features at block 206. The processing features may be permanently disabled by blowing one or more fuses, overwriting security values, setting/clearing certain control bits of a control register, and the like.

Otherwise, if there are re-invocation chances remaining, the system revokes the processing features associated with a security certificate by modifying the corresponding security value so that the modified security value is incompatible with the security certificate (e.g., cannot authenticate the security certificate). In one embodiment, the security value is modified by changing a bit position of an OTP storage location used to store the security value so as to modify the security value as discussed above.

As a result of the incompatibility between the modified security value and the security certificate, the system, or alternately the user, will need to obtain a new security certificate in order to re-enable the disabled processing features. Accordingly, at block 210 a request for a new security certificate that is compatible with the modified security value is sent to a certificate authority. The request may include, for example, a reason for the request, an explanation of why the request should be granted, and the like. Further, the request may include the modified security value so that the certificate authority can bind the new security certificate to the modified security value.

Upon receipt of the new security certificate, the system prepares the new security certificate for implementation at the system at block 214. This preparation can include, for example, decrypting the new security certificate (if encrypted), storing the new security certificate in an internal storage location, encrypting the new security certificate and storing the encrypted version at an external storage location, and re-enabling the disabled processing features. At block 214, the remaining number of re-invocation changes is decremented and the flow returns to block 202.

Figure 3:
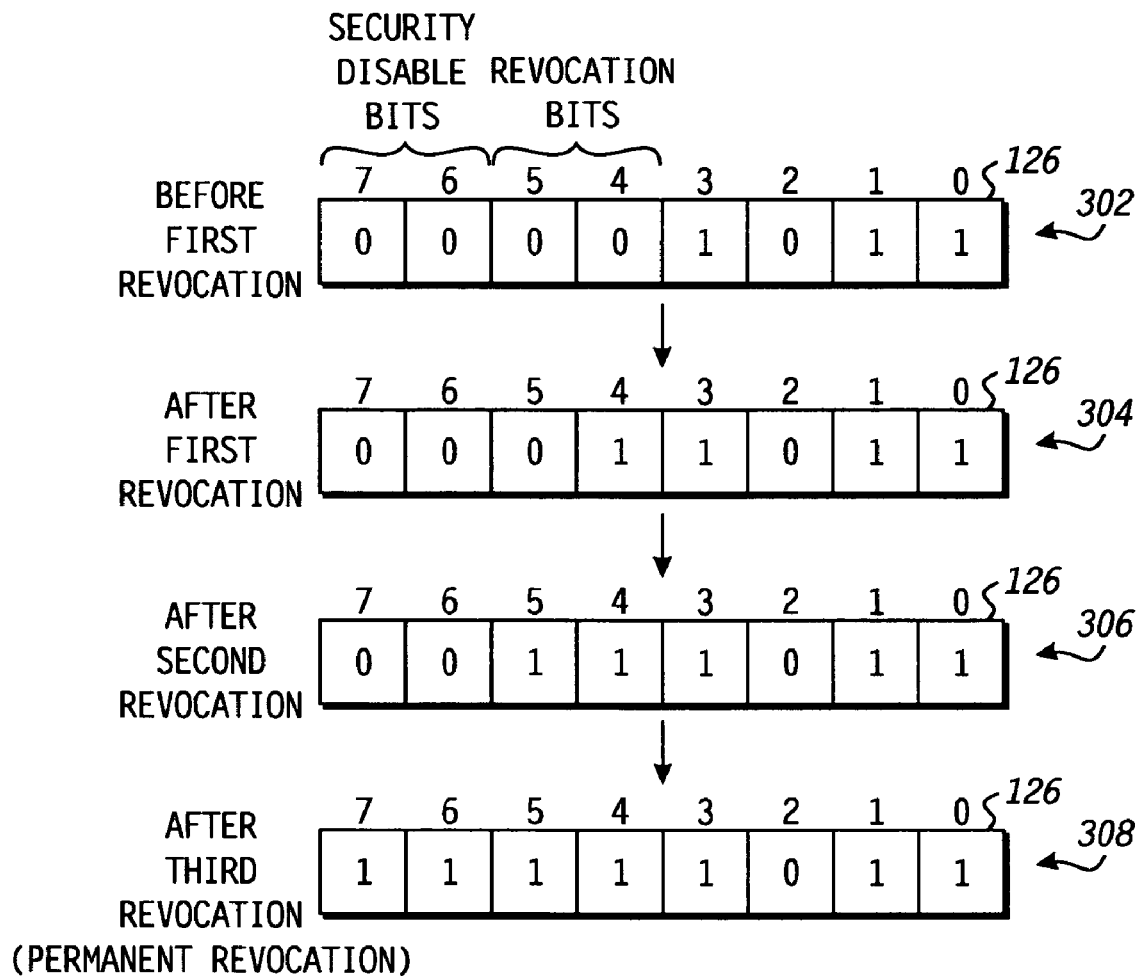
FIG. 3 is a diagram illustrating an exemplary modification of a value stored at a one-time-programmable storage location in response to a sequence of revocation events in accordance with at least one embodiment of the present disclosure.

Referring to FIG. 3, a diagram illustrating an exemplary modification of a value stored at a one-time-programmable storage location in response to a sequence of revocation events in accordance with at least one embodiment of the present disclosure. For ease of discussion, the revocation process is described with respect to the OTP storage location 126 (FIG. 1) used to store the unique system ID.

Storage state 302 illustrates the value initially stored in the OTP storage location 126 prior to any revocation events. In the illustrated example, the OTP storage location 126 has eight bit positions (bits [7:0]), where bits [7:6] are used as control bits to disable an encryption processing feature and a decoding feature, respectively, when changed to a value of '1'. Bits [5:4] are used as revocation bits that are transitioned in response to revocation stimuli, and bits [3:0] are used to store the original system ID ($1011_b$ in this example). As illustrated, bits [7:4] initially have the default value of 0, resulting in the initial security value of $00001011_b$, to which one or more security certificates are bound.

Storage state 304 illustrates the modification of the bit position at bit [4] to a value of '1' in response to a first revocation event so as to change the stored security value to $00001011_b$, which is inconsistent with the security certificate in this example. Accordingly, a request for a new security certificate bound to the modified security value $00011011_b$ is requested and implemented upon receipt.

Storage state 306 illustrates the modification of the bit position at bit [5] to a value of '1' in response to a second revocation event so as to change the stored security value to $00111011_b$, which is inconsistent with the current security certificate in this example. Accordingly, a request for a new security certificate bound to the modified security value $00111011_b$ is requested and implemented upon receipt.

As the illustrated example of FIG. 3 provides for only two re-invocations, the occurrence of a third revocation event results in permanently disabling one or more processing features. As illustrated by storage state 308, the processing features associated with bit positions [6] and [7] can be disabled by modifying these bit positions to a value of 1. As a result, the stored security value is changed to $11111011_b$, which is incompatible with the current security certificate and results in the permanent disabling of the processing features associated with the security disable bit positions [6] and [7].

The stored security value that is altered by revocation may be the system ID (e.g., a chip ID) used for identification, a CW used for de-scrambling or a private exponent used for RSA decryption. For example, a chip ID may be 0x00001234 before being revoked and set to 0x10001234 after being revoked, a CW may be 0x0123456789ABCDEF before being revoked and 0x1123456789ABCDEF after being revoked, and an RSA private exponent may be 0x0123456 . . . ABCDEF before being revoked and 0x1123456 . . . ABCDEF after being revoked. In each case, the new revoked value may be determined from the previous value and may be re-invoked by the certificate authority. In the case of a revoked private exponent, a new set of public exponent and public modulus must be re-calculated which corresponds to the new private exponent so that encrypted data may only be decrypted by the new private exponent and public modulus. If the original system ID, CW and private exponent were unique for all systems then the revoked security values also will be unique provided the most significant 4 bits for all security values in all systems are reserved (i.e. defaulted to 0) for the purpose of revocation.

Figure 4:
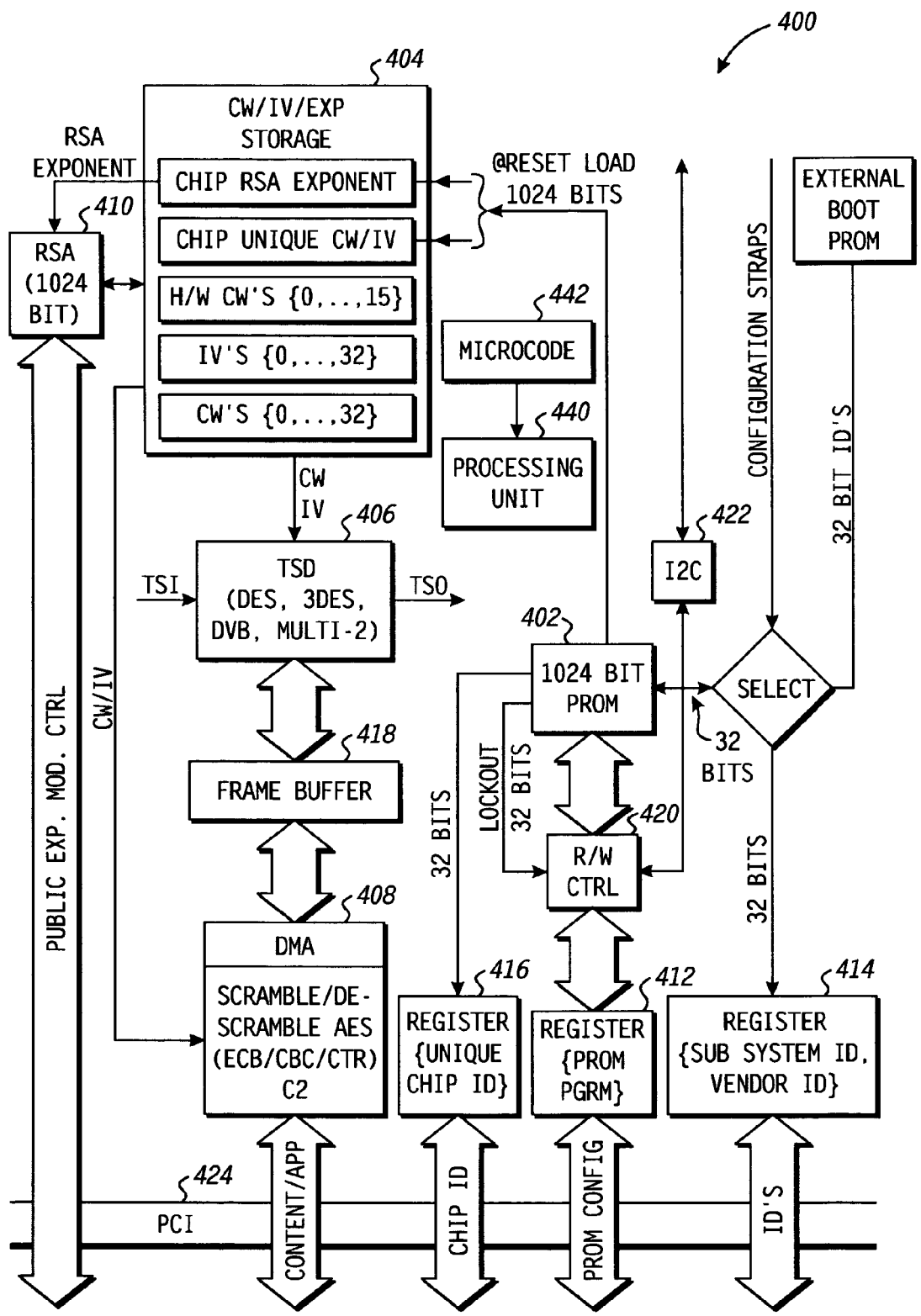
FIG. 4 is a block diagram illustrating an exemplary implementation of the multimedia system of FIG. 1 in accordance with at least one embodiment of the present disclosure.

Referring to FIG. 4, an exemplary system-on-a-chip (SOC) implementation 400 of the multimedia system 100 of FIG. 1 is illustrated in accordance with at least one embodiment of the present disclosure. The SOC 400 includes a 1024 bit PROM 402, a CW/IV/exponent internal storage area 404, a transport stream de-multiplexer (TSD) 406, a direct memory access (DMA) controller 408, an RSA engine 410, plurality of registers 412, 414, 416, a frame buffer 418, a read/write controller 420, an I2C interface 422, and a PCI bus 424.

The PROM 402 can be programmed via the registers 412, 414 and 416 or via the I2C interface 422 and is utilized to record a 32-bit unique chip ID, a 64-bit unique CW/IV, a 32-bit subsystem ID and vendor ID, a private RSA exponent (up to 896 bits), and R/W lockout bits (32 bits). The CW/IV/exponential internal storage area 404 comprises internal memory to store up to 32 64-bit CW values, up to 32 64-bit IV values and up to 16 64-bit CW values.

The TSD 406 processes input multimedia transport stream (TSI) to generate processed output transport streams (TSO). Further, the TSD 406 is configured to support one or more scrambling/descrambling algorithms, such as AES, EBC, cipher block chaining (CBC), CTR, and the C2 cipher. The DMA controller 408 stores and writes multimedia content data and other data to/from memory, and additionally is configures to support one or more scrambling/descrambling algorithms, such as DES, 3DES, DVB, Multi-2, and the like, using the stored CWs, Ws and chip ID so as to scramble/descramble content transmitted via the PCI bus 424. The unscrambled content is stored in the frame buffer 418. The RSA engine 410 provides RSA-based encryption/decryption using the stored RSA exponent.

In at least one embodiment, unscrambled versions of security certificates are stored in the frame buffer 418. In response to a revocation event, an interrupt is generated and transmitted to the processing unit 440. The processing unit then loads and executes a microcode interrupt handling routine 442 that implements the revocation/re-invocation process described herein, wherein the security values (e.g., the CWs, IVs, exponents, and IDs) may be modified in the PROM 402 or the registers 412-414 so as to revoke certain processing features.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   storing, at a one-time programmable (OTP) storage location of a system, a first security value;
   utilizing, at the system, a first security certificate compatible with the first security value and incompatible with at least a second security value, wherein the first security certificate enables one or more processing features of the system in conjunction with the first security value;
   receiving, at the system, a certificate revocation stimulus; and
   modifying a value at a first bit position of the OTP storage location so as to convert the first security value stored at the OTP storage location to the second security value in response to receiving the certificate revocation stimulus.

2. The method of claim 1, further comprising:
   receiving, at the system, a second security certificate compatible with the second security value and incompatible with at least a third security value; and
   utilizing, at the system, the second security certificate, wherein the second security certificate enables one or more processing features of the system in conjunction with the second security value.

3. The method of claim 2, further comprising:
   transmitting a request for the second security certificate to a certificate authority in response to the conversion of the first security value to the second security value at the OTP storage location; and
   wherein the second security certificate is received in response to the request for the second security certificate.

4. The method of claim 2, wherein:
   the second security certificate is received as an encrypted security certificate; and
   the method further comprises decrypting, at the system, the encrypted security certificate to generate the second security certificate.

5. The method of claim 2, further comprising:
   receiving, at the system, a second certificate revocation stimulus subsequent to receiving the first certificate revocation stimulus.
   modifying a value at a second bit position of the OTP storage location so as to convert the second security value stored at the OTP storage location to the third security value.

6. The method of claim 1, wherein utilizing the first security certificate comprises:
   enabling the one or more processing features of the system when the first security value is accessible from the OTP storage location; and
   disabling the one or more processing features of the system when the first security value is not accessible from the OTP storage location.

7. The method of claim 1, wherein the one or more processing features comprises at least one of an encryption processing feature, a decryption processing feature, a multimedia decoding processing feature, a multimedia encoding processing feature, a multimedia transcoding processing feature, a multiple data stream processing feature, a mass storage system access processing feature, or a display control processing feature.

8. The method of claim 1, wherein the certificate revocation stimulus comprises a revocation command issued by an entity including or in association with at least one of a certificate authority, a multimedia content provider or a manufacturer of the system.

9. The method of claim 1, further comprising:
   receiving, at the system, a representation of one or more unique identifiers identifying systems to be revoked; and
   wherein the certificate revocation stimulus comprises a determination that the one or more unique identifiers includes a unique identifier of the system.

10. The method of claim 9, wherein receiving the representation of the one or more unique identifiers comprises receiving multimedia data at the system, wherein the representation of the one or more unique identifiers is embedded in the multimedia data.

11. The method of claim 10, wherein the representation of the one or more unique identifiers comprises a digital watermark embedded in the multimedia data.

12. The method of claim 1, further comprising:
   receiving, at the system, a second certificate revocation stimulus subsequent to receiving the first certificate revocation stimulus; and
   permanently disabling one or more processing features of the system in response to receiving the second revocation stimulus.

13. The method of claim 12, wherein permanently disabling the one or more processing features of the system comprises modifying a value at a second bit position of the OTP storage location associated with at least one processing feature of the system, wherein the at least one processing feature of the multimedia system is disabled when the modified value is present at the second bit position of the OTP storage location.

14. The method of claim 12, wherein permanently disabling the one or more processing features of the system comprises at least one of blowing one or more fuses of the system associated with the one or more processing features or modifying a unique value stored at a storage location of the system.

15. The method of claim 1, wherein the system comprises a multimedia system.

16. The method of claim 15, wherein the multimedia system comprises at least one of: a television, a computer, a set-top box, a video-enable portable phone or a personal digital assistant.

17. The method of claim 1, wherein the system comprises an integrated circuit device.

18. A system comprising:
 a one-time programmable (OTP) storage location to store a security value;
 a certificate storage component to store one or more security certificates;
 a multimedia processing module to process multimedia data; and
 a security module operably coupled to the OTP storage location and the multimedia processing module, wherein the security module is to:
  disable one or more processing features of the multimedia processing module in response to determining an incompatibility between a selected security certificate stored at the certificate storage module and the security value stored at the OTP storage location; and
  modify the security value by modifying a value at an identified bit position of the OTP storage location in response to a certificate revocation stimulus.

19. The system of claim 18, further comprising:
 an encryption module to decrypt encrypted data.

20. The system of claim 19, wherein the security module further is to disable one or more processing features of the encryption module in response to determining the incompatibility between the selected security certificate and the security value.

21. The system of claim 19, wherein:
 the encrypted data comprises an encrypted security certificate compatible with the modified security value; and
 wherein a decrypted version of the encrypted security certificate is stored as the selected security certificate at the certificate storage component.

22. The system of claim 18, wherein the security module further is to permanently disable one or more processing features of the system in response to a second certificate revocation stimulus.

23. The system of claim 18, wherein:
 the multimedia data includes a representation of one or more unique identifiers; and
 the first certificate revocation stimulus comprises a determination that one or more unique identifiers includes a unique identifier of the system.

24. The system of claim 23, wherein the representation of the one or more unique identifiers is embedded in the multimedia data as digital watermark data.

25. The system of claim 18, wherein the system comprises a multimedia system.

26. The system of claim 25, wherein the multimedia system comprises at least one of: a television, a computer, a set-top box, a video-enable portable phone or a personal digital assistant.

27. The system of claim 18, wherein the system comprises an integrated circuit device.

28. A method comprising:
 issuing a first security certificate from a certificate authority to a processing device, wherein the first security certificate is compatible with a first security value stored at the processing device and wherein the first security certificate, in conjunction with the first security value, enables one or more processing features of the processing device;
 modifying, at the processing device, the stored first security value to generate a second security value in response to a certificate revocation stimulus;
 providing, via a communications link, a reinvocation request from the processing device to the certificate authority in response to modifying the stored first security value, the reinvocation request including a representation of the second security value; and
 issuing a second security certificate from the certificate authority to the processing device, wherein the second security certificate is compatible with the second security value stored at the processing device and wherein the second security certificate, in conjunction with the second security value, enables the one or more processing features of the processing device;
 wherein modifying the stored first security value comprises modifying a value at a first bit position of a one-time programmable (OTP) storage location of the processing device that stores the first security value so as to convert the first security value to the second security value.

29. The method of claim 28, further comprising:
 providing a list of one or more unique identifiers from the certificate authority to the processing device; and
 wherein the certificate revocation stimulus comprises a presence of a unique identifier of the processing device in the list of one or more unique identifiers.

30. A system comprising:
 a processing device comprising:
  a storage location to store a security value;
  a certificate storage component to store one or more security certificates; and
  a security module operably coupled to the storage location, wherein the security module is to:
   modify the security value in response to a certificate revocation stimulus to generate a modified security value;
   disable one or more processing features of the processing device in response to determining an incompatibility between a selected first security certificate stored at the certificate storage module and the security value stored at the storage location; and
   transmit, via a communications link, a reinvocation request in response to disabling the one or more processing features, the reinvocation request including a representation of the modified security value;
 a certificate authority coupled to the processing device via the communications link, wherein the certificate authority is to:

generate a second security certificate in response to the reinvocation request, wherein the second security certificate is compatible with the modified security value; and issue the second security certificate to the processing device for implementation at the processing device;

wherein:

the storage location comprises a one-time-programmable (OTP) storage location; and the security module is to modify the first security value by modifying a value at a bit position of the OTP storage location.

* * * * *